(12) United States Patent
Corr

(10) Patent No.: US 6,399,964 B1
(45) Date of Patent: Jun. 4, 2002

(54) LOW SKEW SIGNAL DISTRIBUTION FOR INTEGRATED CIRCUITS

(75) Inventor: William Eric Corr, Twickenham (GB)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/377,999

(22) Filed: Aug. 20, 1999

(51) Int. Cl.$^7$ ................................................ H01L 27/15
(52) U.S. Cl. ............................ 257/99; 257/82; 257/91; 257/98
(58) Field of Search .......................... 257/680, 82, 84, 257/91, 81, 98, 99, 100, 679; 385/14, 49; 438/116, 106, 121

(56) References Cited

U.S. PATENT DOCUMENTS

| 4,695,120 | A | | 9/1987 | Holder | |
|---|---|---|---|---|---|
| 5,094,526 | A | * | 3/1992 | Freud | 385/14 |
| 5,199,087 | A | | 3/1993 | Frazier | |
| 5,416,861 | A | | 5/1995 | Koh et al. | |
| 5,477,075 | A | * | 12/1995 | Forrest | 257/432 |
| 5,530,269 | A | * | 6/1996 | Tang | 257/88 |
| 5,693,956 | A | * | 12/1997 | Shi | 257/40 |
| 5,760,439 | A | * | 6/1998 | Tanaka | 257/323 |
| 5,834,835 | A | * | 11/1998 | Mackawa | 257/680 |
| 6,121,656 | A | * | 9/2000 | Tanaka | 257/323 |

FOREIGN PATENT DOCUMENTS

| EP | 0043475 | * | 1/1982 |
|---|---|---|---|
| GB | 2131567 | * | 6/1984 |
| JP | 07335855 | | 12/1995 |

* cited by examiner

*Primary Examiner*—Olik Chaudhuri
*Assistant Examiner*—Nathan W. Ha
(74) *Attorney, Agent, or Firm*—Oppenheimer Wolff & Donnelly, L.L.P.

(57) ABSTRACT

An integrated circuit device including a semiconductor die and optical signal emitting diodes for communicating different color optical signals, such as multi-phase clock or trigger signals, to individual circuits on the die. Each circuit includes a filter to discriminate the desired frequency and a photosensitive active device implemented on the die for converting the received optical signal to an electronic signal for clocking or triggering a local circuit (e.g., a data storage register). Translucent material encapsulates the emitter diode and the die. The optically communicated signal has very low skew, which is independent of the topology of the die.

36 Claims, 1 Drawing Sheet

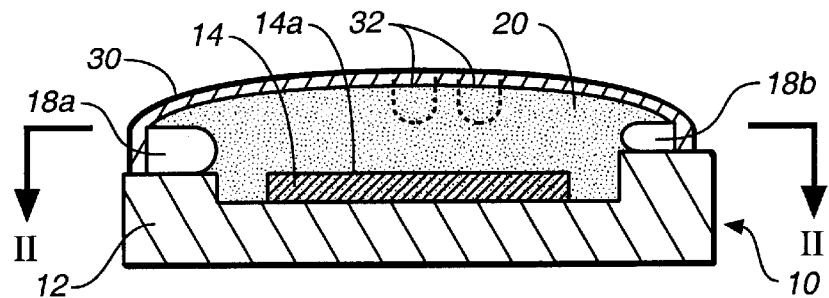
FIG._1
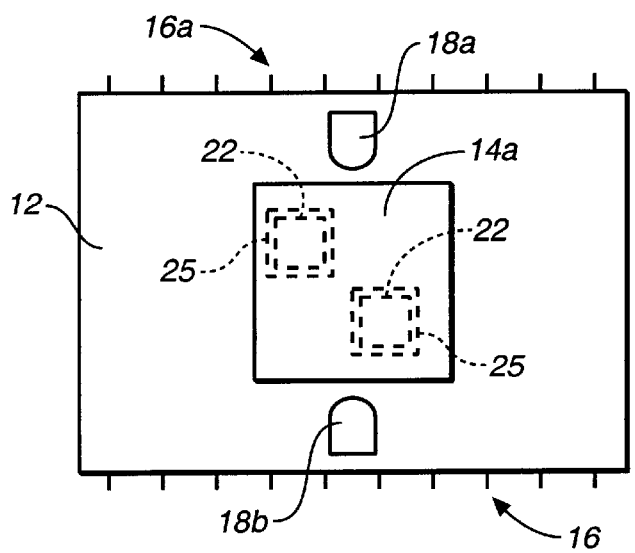
FIG._2
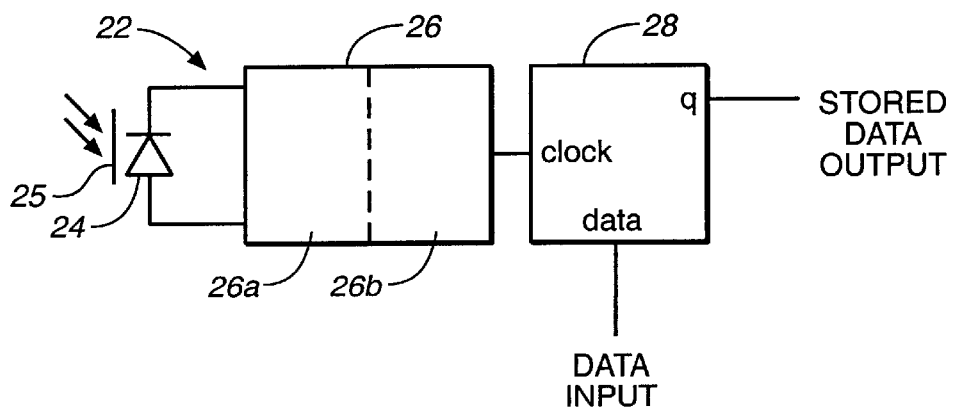
FIG._3

LOW SKEW SIGNAL DISTRIBUTION FOR INTEGRATED CIRCUITS

FIELD OF THE INVENTION

This invention relates to the distribution of a plurality of signals in, or for, integrated circuits, with minimal signal skew; The invention is particularly suited to distributing signals such as clock (for example, two phase clock) or trigger signals, but it is not limited exclusively to such signals.

BACKGROUND OF THE INVENTION

Within integrated circuits, clock signals are usually distributed across the integrated circuit die by metal interconnect layers. This has the intrinsic disadvantage that the metal layer used to distribute the clock signal can be affected by signal path "wires" in other layers running parallel to, or crossing, the clock signal "wires."

These wires in other layers cause problems because they couple capacitively with the clock wire, causing variations in the speed at which the clock signal can be propagated around the die. The variation in propagation delay is referred to herein as "skew." Skew is important because it can be very difficult to ensure that the clock pulses reach different parts of the die at the same time. Skew is one of the factors which can severely limit the maximum operating speed of the integrated circuit; problems can occur if some parts of the integrated circuit are operating out of sequence with others, due to a large clock signal skew.

Even if very sophisticated clock signal routing algorithms are used, the clock wires will always be running near other wires. It is possible to predict the capacitive effect of wires running in close proximity to each other by using a special routing algorithm. However, such predictions are only effective for DC signal conditions; it is harder to predict the actual effect which may occur if the wires carry switching signals which have a different effect from a DC line, even for simple circuit configurations. With the increasing complexity of integrated circuits with many billions of internal wires, it is difficult even to predict DC coupling effects, and virtually impossible to predict dynamic switching effect in realistic design timescales.

The above problems can often delay development and design of integrated circuits, and increase development costs. Different arrangements of clock wires may be tried and refined progressively to counter the effects of unpredictable skew.

The above problems are increased when two or more different clocks have to be distributed over a die, with minimum and matching signal skew.

Co-pending application GB 9712177.6 describes an optical arrangement for a single clock to be distributed over a semiconductor die. However, this would not permit the distribution of two or more signals without the provision of dedicated, exclusive light paths.

U.S. Pat. No. 5,416,861 (Koh et al.) discloses in FIG. 9 thereof that the optical signal is demultiplexed before it arrives at the chip by a specific demultiplexer. The individual optical components are then fed by separate light paths to the respective optical receivers on the chip. This is undesirable, however, because it requires an external demultiplexer, and because it requires a plurality of dedicated lights paths into the chip, and within the chip itself.

SUMMARY OF THE INVENTION

The present invention has been devised bearing the above problems in mind.

Broadly speaking, one aspect of the invention is to communicate, and/or distribute, a plurality of signals to, and/or within, an integrated circuit package as a plurality of optical signals of different frequencies on a common optical path, and to provide a plurality of photosensors to receive signals from the optical path, each photosensor being responsive to a particular desired frequency. The term "optical" as used herein is not restricted to visible light, but is intended to refer generally to radiation which substantially obeys the laws of optics.

Preferably, each photosensor is provided with a filter to make the photosensor frequency dependent. In other words, the photosensor will only respond to optical signals having a desired frequency (or falling within a desired frequency band).

Such a technique can avoid the problems of capacitive coupling and other signal interference encountered with traditional interconnect wires, and enable signals to be distributed with minimal signal skew. The speed of signal propagation is limited only by the speed of light (and the switching speed of the circuit components used to produce and receive the optical signals, which is predictable). For example, for a 15 mm die, the attainable skew could be as small as about 50 ps. This compares very favorably with the minimum of about 400 ps which is attainable with conventional distribution wires. It is expected that future technologies will require a skew of less than about 200 ps, which will be very difficult to achieve using conventional wire techniques.

Moreover, the invention avoids the need to provide different light paths for the different optical signals. Instead, a common light path can be used, each photosensor being able to discriminate the desired optical signals therefrom.

The invention can be used to distribute signals, such as clock or trigger signals, simultaneously to different parts of the integrated circuit die, without the same routing and design constraints as those associated with: distribution wires. This can provide the die designer with greater flexibility of design, and allow circuits to be arranged on the die in relative positions not previously regarded as practical.

The invention can enable development time and costs to be reduced by producing predictable skew across the die. Furthermore, by not using metal wires to distribute clock signals, the number of layout steps would be reduced, which further reduces the time needed to complete a design.

An optical signal may be produced by an optical emitter carried on the die, or carried within the integrated circuit package containing the die, or mounted externally to provide an optical input to the package. The optical signal may illuminate substantially an entire surface of the die, or one or more predetermined areas of the die. Opaque masks may be used to mask areas of the die not intended to receive optical radiation (for example, to reduce unwanted photoelectric effects). If desired an optical guide (i.e., a light guide) may be provided to define one or more common predetermined optical paths for the optical signal. Such a guide may be provided by translucent material which can diffuse the light to achieve excellent omni-directional illumination, and avoid shadow effects.

More than one emitter may be used to generate a larger magnitude optical signal, or a plurality of different optical signals. In a preferred embodiment, a plurality of emitters having different emission frequencies are used to emit a plurality of different optical signals into a common optical channel.

At least one optical signal may be directly equivalent to the signal it represents, so that a digital pulse (e.g., a clock pulse) is represented by an optical pulse. Alternatively, the optical signals may be encoded, for example by modulation.

The optical signal may represent a single signal, or it may represent a plurality of signals. For example, the plurality of signals may be multiplexed, or have different characteristic carrier or modulation frequencies, or be represented by different radiation wavelengths, to enable individual signals to be separated either optically or electronically.

In a preferred embodiment, the optical signals are clock signals, and are distributed across the die and used to clock a plurality of circuit elements, for example, data storage registers. Each element may have, or be associated with, its own optical receiver. Alternatively, pluralities of elements may be grouped together and fed from a respective optical receiver for the group. In this way, the optical technique is used to distribute signals on a die-scale, and local wires are then used to distribute the signals to local circuits. A circuit may used to provide a local clock signal different from, but derived from, the optical signal. In this way, the local circuits can be driven by locally generated signals which are synchronized across the die to the optical signal.

BRIEF DESCRIPTION OF THE DRAWINGS

An embodiment of the invention is now described by way of example, with reference to the accompanying drawings, in which:

FIG. 1 is schematic section through an integrated circuit package;

FIG. 2 is a schematic section along the line II—II of FIG. 1; and

FIG. 3 is a schematic circuit diagram of a circuit element implemented on the integrated circuit die.

DETAILED DESCRIPTION OF A PREFERRED EMBODIMENT

Referring to FIGS. 1 and 2, an integrated circuit device 10 consists of a package base 12 on which is carried an integrated circuit die 14. In this embodiment, the die 14 is based on a silicon substrate, but other embodiments may use different semiconductor materials. In FIG. 1, the conventional package terminal pins or balls, and the connections between the pins (or balls) and the die, have been omitted for the sake of clarity; these features are well known to those skilled in the art. Pins are denoted schematically in FIG. 2 by numeral 16.

The device 10 includes a first optical emitter 18a mounted on one side of, and slightly above, the upper surface 14a of the die 14, and a second optical emitter 18b mounted on the other side of, and slightly above, the upper surface of the die 14. The emitters 18a and 18b are supported by the package base 12 and are attached thereto, for example, by adhesive. The die 14 and the emitters 18a and 18b are covered by translucent encapsulation material 20 to provide a common light channel, allowing light emitted by the emitters 18a and 18b to fall on the die surface 14a.

In this embodiment, the first emitter 18a is a red LED, and the second emitter 18b is a blue LED. The emitters are used to distribute a two-phase clock signal across the die. The emitters 18a and 18b are driven by respective external signals applied through one or more respective "clock input" pins 16a of the device 10. Alternatively, a single clock input might be provided, which is converted to a two-phase clock by circuitry on the chip.

Referring especially to FIG. 2, the die 14 includes a plurality of circuit elements 22, two of which are illustrated.

The size of the elements is greatly exaggerated in FIG. 2 for the sake of clarity; this figure is purely schematic. Each circuit element 22 includes an optical receiver, in the form of a phototransistor or photodiode 24, positioned in the die 14 to receive optical radiation through the upper face 14a. The light signals are used as clock signals for clocking operation of the circuit elements 22. Each phototransistor 24 is covered by a filter 25 to pass either red light or blue light to the phototransistor, depending on which clock phase the circuit element 22 is intended to be responsive to.

FIG. 3 illustrates an example of a circuit element 22. The output from the photodiode 24 is coupled to the input of a conditioning circuit 26, which may typically include an amplifier 26a and a thresholding circuit 26b for conditioning the optically received signal. The output from the conditioning circuit 26 represents a usable clock signal, and is provided as a clock input to a data storage register 28, to clock the register 28.

In this embodiment, the translucent encapsulation 20 serves to diffuse the light from the emitters 18a and 18b, so that the orientation of the emitter 18 is not critical. The diffusion enables the die to be uniformly illuminated by both optical signals, and can avoid the creation of shadows which might otherwise result from the oblique position of the emitters 18a and 18b. The encapsulation 20 is covered by an opaque layer 30 to prevent external radiation from interfering with the optical clock signal. The diffusion also enables the light to reach positions on or in the die which are not in line-of-sight with the emitters 18a or 18b. For example, the light can penetrate to active lower layers of the die 14 on which some of the photodiodes 24 may be formed, and to reach the sides of the die.

In this embodiment, the emitters 18a and 18b are positioned adjacent to, and symmetrically relative to, the die 14 to reduce signal skew. However, in other embodiments, one or more of the emitters may be arranged at a greater distance from the die, or non-symmetrically relative to the die.

In this embodiment, each emitter 18 is mounted in almost the same plane as the die 14, so that the height profile of the device 10 is not substantially increased. Moreover, the upper region of the device is left clear for mounting a heatsink, if desired. In an alternative embodiment, the emitters could be mounted below the upper face 14a of the die 14, and the diffusion caused by the translucent encapsulation 20 could spread the light over the die 14.

In another alternative embodiment the emitters may be mounted above the die 14 and point downwardly (as depicted in phantom in FIG. 1 by numeral 32). Such an arrangement can reduce signal skew even further, but might not be practical if a heatsink is desired to be mounted.

Each emitter 18 may be implemented as a light emitting diode, or as a laser diode, or as any other suitable device capable of being operated at a desired switching speed, and outputting light at a desired frequency, or within a desired frequency band. The emitter may emit radiation in the visible wavelength range or, for example, in the infra-red wavelength range.

The photodiode 24 can be integrated very simply, because all metal oxide semiconductor (MOS) active devices have a photoelectric effect. All that is required is a different type of layout structure from conventional transistors to maximize this effect. To ensure that other MOS devices are not affected by the light signals, an additional opaque layer may be added to the top of the die during the manufacturing process. Holes would be created in the opaque layer to allow light penetration to the areas of the photodiodes. This technique is not limited only to MOS devices, as other semiconductor devices exhibit similar photo-sensitivity.

Although the embodiment illustrates two signal components being distributed and discriminated as two different frequencies, it will be appreciated that three or more different signals could be distributed using the same techniques. Filters could be used adjacent to the optical emitters to provide additional signal frequencies from two similar broad-band emitters.

It will be appreciated that the foregoing description is merely illustrative of a currently preferred embodiment, and that many modifications may be made without departing from the principles of the invention. In particular, the package construction, the arrangement of the optical emitter(s) and of the optical receivers, and the die may vary with different device styles and semiconductor implementations.

It will also be appreciated that the invention, particularly as described in the preferred embodiments, can enable plural signals to be communicated to, or distributed in, an integrated circuit device with much less signal skew than conventional techniques using interconnect wires. Just as importantly, the amount of skew is largely independent of the die topology, and can easily be predicted. Moreover, the plural optical signals do not require dedicated light paths. In the preferred embodiment, each emitter illuminates substantially the entire surface of the die. The components may be different phases of a multi-phase clock, or they may be different signal types.

While features believed to be of importance have been identified in the appended claims, protection is claimed for any novel feature or combination of features described herein and/or illustrated in the accompanying drawings, irrespective of whether emphasis has been placed thereon.

What is claimed is:

1. An integrated circuit chip device, comprising:
   an integrated circuit die within a case;
   a plurality of optical emitters within the case, each having a different emission frequency, for distributing to the die a plurality of different frequency-multiplexed optical signals into a common channel, each of the plurality of optical signals having a plurality of frequency components;
   a plurality of optical receivers on the die responsive to the plurality of frequency components of the optical signals; and
   each of the plurality of optical receivers having a photosensitive active semiconductor element and an optical filter to provide the photosensitive active semiconductor element with a frequency dependent response to said optical signals, wherein the use of the optical filters allows the optical signals to be distributed across the die with minimal signal skew.

2. A device according to claim 1, wherein a first optical receiver of the plurality of optical receivers is implemented in or on a first area of the die to produce a first electronic signal from the a first frequency component of one of the optical signals, and a second optical receiver of the plurality of optical receivers is implemented in or on a second area of the die to produce a second electronic signal from a second frequency component of another one of the optical signals.

3. A device according to claim 2, wherein the plurality of optical emitters provide the first and second components of the optical signals to both the first area of the die and the second area of the die.

4. A device according to claim 1, wherein each of the plurality of optical receivers is coupled to a data signal handling circuit, the circuit being clockable or triggerable in response to the optical signal received by the optical receiver.

5. A device according to claim 4, wherein at least one of the data signal handling circuits comprises a data storage register.

6. A device according to claim 1, wherein the plurality of optical emitters include a first optical emitter which emits an optical signal having the first frequency component and a second optical emitter which emits an optical signal having the second frequency component.

7. A device according to claim 6, wherein each of the first and second optical emitters comprise a light emitting diode.

8. A device according to claim 6, wherein each of the first and second optical emitters comprises a laser diode.

9. A device according to claim 6, wherein each of the first and second optical emitters are mounted to illuminate the die from one or more sides.

10. A device according to claim 6, wherein the first and second optical emitters are mounted above a face of the die.

11. A device according to claim 6, wherein the first and second optical emitters are coupled to be driven by signals applied through one or more external terminals of the integrated circuit device.

12. A device according to claim 1, wherein each of the first and second optical emitters comprises an optically transparent or translucent material which communicates the optical signals to a surface of the die.

13. A device according to claim 12, wherein the die is at least partly encapsulated by the transparent or translucent material.

14. A device according to claim 1, wherein the die has an opaque mask with openings defining areas of the die intended to receive the optical signals.

15. A device according to claim 1, wherein the plurality of optical receivers receive first and second phases of a multi-phase clock signal.

16. A device according to claim 1, wherein the plurality of optical emitters comprise a light emitting diode.

17. A device according to claim 1, wherein the plurality of optical emitters comprises a laser diode.

18. A device according to claim 1, wherein the plurality of optical emitters are mounted to illuminate the die from one or more sides.

19. A device according to claim 1, wherein the plurality of optical emitters are mounted above a face of the die.

20. A device according to claim 1, wherein the plurality of optical emitters are coupled to be driven by signals applied through one or more external terminals of the integrated circuit device.

21. An integrated circuit device, comprising:
    an integrated circuit die;
    a plurality of optical emitters each having different emission frequencies for distributing multi-frequency optical signals to at least first and second areas of the die through a common optical channel;
    a first optical receiver implemented in or on the first area of the die to produce a first electronic signal synchronized to a first frequency component of one of the optical signals; and
    a second optical receiver implemented in or on the second area of the die to produce a second electronic signal synchronized to a second frequency component of the one of the optical signals, wherein each of the optical receivers includes an optical filter to provide each optical receiver with a frequency dependent response to said optical signals, resulting in the optical signals being distributed across the die with minimal signal skew.

22. A device according to claim 21, wherein each of the first and second optical receivers is coupled to a data signal handling circuit, the circuit being clockable or triggerable in response to the frequency component of the optical signal received by the respective optical receiver.

23. A device according to claim 22, wherein at least one of the data signal handling circuits comprises a data storage register.

24. A device according to claim 21, wherein the plurality of optical emitters each comprise a light emitting diode.

25. A device according to claim 21, wherein the plurality of optical emitters each comprise a laser diode.

26. A device according to claim 21, wherein the plurality of optical emitters are carried by a device which supports the die.

27. A device according to claim 21, wherein the plurality of optical emitters are mounted to illuminate the die from one or more sides.

28. A device according to claim 21, wherein the plurality of optical emitters are mounted above a face of the die.

29. A device according to claim 21, wherein the plurality of optical emitters are coupled to be driven by signals applied through one or more external terminals of the integrated circuit device.

30. A device according to claim 21, wherein the plurality of optical emitter each comprise an optically transparent or translucent material which communicates an optical signal to a surface of the die.

31. A device according to claim 30, wherein the die is at least partly encapsulated by the transparent or translucent material.

32. A device according to claim 21, wherein the die has an opaque mask with openings defining areas of the die intended to receive an optical signal.

33. A device according to claim 21, wherein the first and second optical receivers receive first and second phases of a multi-phase clock signal.

34. An integrated circuit chip device, comprising:

a case;

an integrated circuit die within the case;

a series of generating devices within the case which generate a plurality of frequency multiplexed optical signals each having first and second frequency components across a common optical channel, the series of generating devices comprising a first optical emitter which generates the first component frequency of an optical signal and a second optical emitter which generates the second component frequency of the optical signal;

a first optical receiver on the die responsive to the first frequency component of the optical signal;

a second optical receiver on the die responsive to the second frequency component of the optical signal; and each of the optical receivers having a photosensitive active semiconductor element and an optical filter allowing the photosensitive active element to be responsive to said frequency components of said optical signal, the optical filters allowing the plurality of optical signals to be distributed across the die with minimal signal skew.

35. An integrated circuit device, comprising:

an integrated circuit die;

a plurality of optical emitters generating, across a common optical channel, a plurality of frequency multiplexed optical signals;

a plurality of optical receivers on the die;

a first one of the plurality of optical receivers being responsive to a first predetermined optical frequency of one of the frequency multiplexed optical signal fed to the plurality of receivers;

a second one of the optical receivers being responsive to a different second predetermined optical frequency of the one of the frequency multiplexed optical signal; and a photosensitive active semiconductor element and an optical filter coupled to each of the first and second optical receivers to allow the first and second optical receivers to be responsive to a different predetermined frequency component of each of the frequency multiplexed optical signals, the optical filters allowing the frequency multiplexed optical signals to be distributed across the die with minimal signal skew.

36. An integrated circuit device, comprising:

a chip;

a plurality of optical emitters within the chip, each having a different emission frequency and driven by external electrical pins, the plurality of optical emitters for generating a plurality of different, frequency multiplexed optical signals into a common optical channel; and a plurality of optical receivers on the chip, each of the optical receivers having an optical filter to allow the optical receivers to be responsive to a different frequency component of one of plurality of optical signals.

* * * * *